United States Patent [19]

Shenk

[11] Patent Number: 5,464,191
[45] Date of Patent: Nov. 7, 1995

[54] SOLENOID ACTUATED VALVE

[75] Inventor: David Shenk, Rockford, Ill.

[73] Assignee: Envirovac, Inc., Rockford, Ill.

[21] Appl. No.: 178,523

[22] Filed: Jan. 6, 1994

[51] Int. Cl.$^6$ ............................................. F16K 31/02
[52] U.S. Cl. ..................... 251/129.21; 251/129.15; 251/368
[58] Field of Search ................. 251/368, 129.21, 251/129.15

[56] References Cited

U.S. PATENT DOCUMENTS

| | | | |
|---|---|---|---|
| 3,321,177 | 5/1967 | Fendel et al. | 251/129.21 X |
| 4,056,255 | 11/1977 | Lace | 251/129.15 |
| 4,118,009 | 10/1978 | Chmura | 251/368 |
| 4,811,754 | 3/1989 | Wilhelm | 251/129.21 X |
| 5,170,987 | 12/1992 | Krauss et al. | 251/129.21 |

FOREIGN PATENT DOCUMENTS

| | | | |
|---|---|---|---|
| 0186683 | 11/1982 | Japan | 251/129.21 |
| 1389055 | 4/1975 | United Kingdom | 251/129.21 |

OTHER PUBLICATIONS

Lampedes, Daniel N., "Dictionary Of Scientific And Technical Terms", 2nd Edition, N.Y. McGraw–Hill, 1978. p. 1173.

Primary Examiner—John Rivell
Attorney, Agent, or Firm—Smith-Hill and Bedell

[57] ABSTRACT

A solenoid actuated valve for controlling flow of fluid through a bore defined by a tube comprises an armature fitted slidably in the bore for displacement therein under solenoid control. The armature comprises a generally cylindrical magnetic body that is a clearance fit in the bore, and a glide pad carried by the magnetic body for guiding movement of the magnetic body relative to the tube and preventing direct sliding contact therebetween.

6 Claims, 1 Drawing Sheet

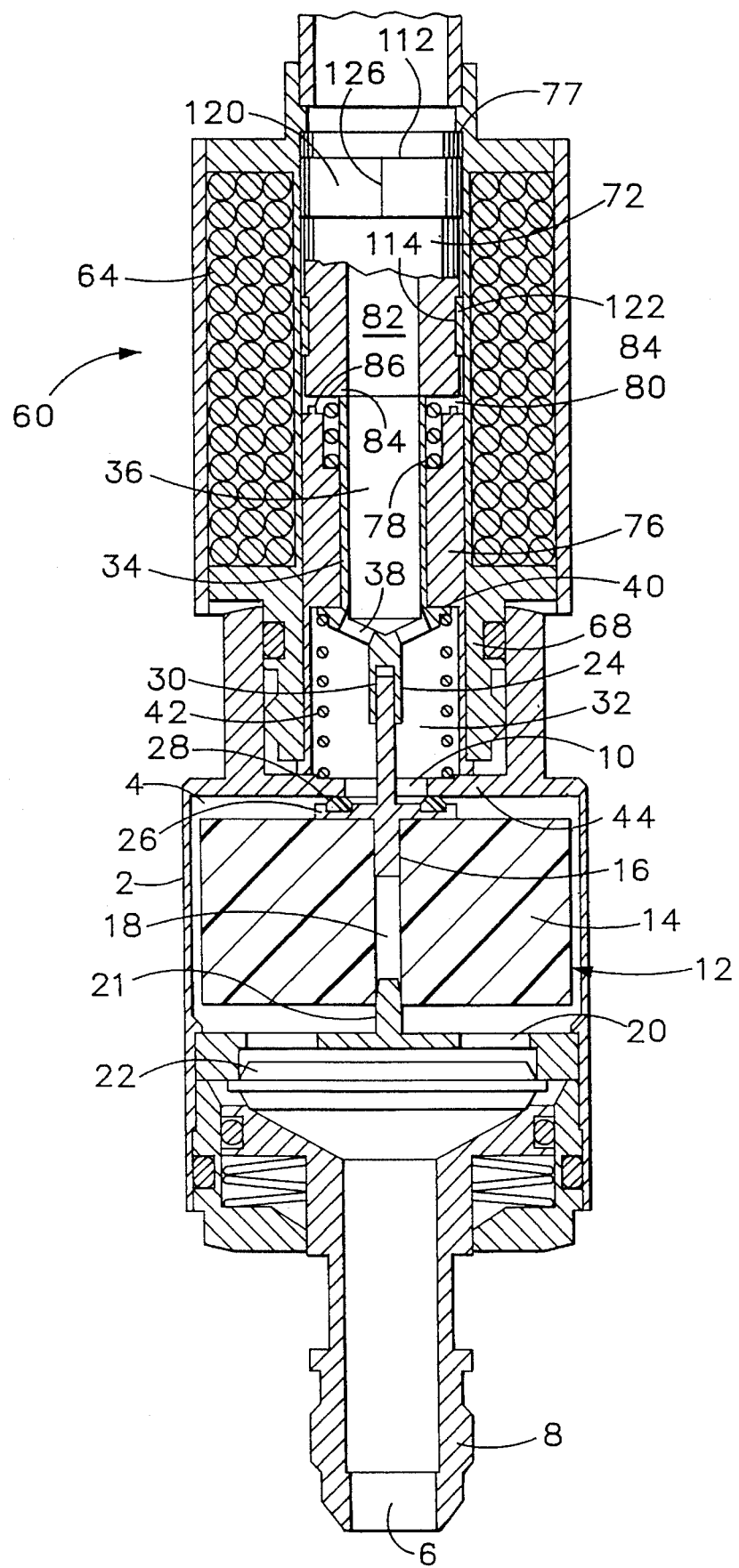

1

SOLENOID ACTUATED VALVE

BACKGROUND OF THE INVENTION

This invention relates to a solenoid actuated valve.

U.S. Pat. No. 4,811,754 issued Mar. 14, 1989, the disclosure of which is hereby incorporated by reference herein, describes a solenoid actuated valve for controlling flow of aqueous rinse liquid to a vacuum toilet and is particularly designed for use in an aircraft toilet system in which the rinse liquid is potable water. The valve comprises an armature that is fitted for sliding movement within a tube through which the rinse water itself also flows. Movement of the armature under control of a solenoid that is located outside the tube controls movement of a closure member into and out of contact with a valve seat. This valve operates without need for an external linkage connecting the moveable closure member to a source of mechanical power, or for seals preventing leakage around such a linkage.

In a valve of the kind shown in U.S. Pat. No. 4,811,754, the armature must be free to move axially within the solenoid bore, and the gap between the armature and the solenoid bore must be minimized in order to avoid flux leakage.

In a practical implementation of the valve shown in U.S. Pat. No. 4,811,754, the armature was made of nickel-plated stainless steel. This material was satisfactory when the valve was new because the nickel plating providing a good bearing surface. However, the plating was subject to wear and/or oxidation, so that the quality of the bearing surface deteriorated. This resulted in the armature movement being impeded, so that the valve became unreliable. For example, the valve might remain open when it should have closed, and it might remain closed when it should open.

Various efforts have been made to solve the problems of wear and oxidation. Chromium plating the armature was unsuccessful because the chromium plating also was subject to wear and/or oxidation. A plating of nickel impregnated with PTFE was subject to oxidation, and poor adhesion between the stainless steel armature and the plating resulted in worse wear performance than the simple nickel plating.

SUMMARY OF THE INVENTION

In accordance with the present invention there is provided a solenoid actuated valve for controlling flow of fluid through a bore defined by a tube member, said valve comprising an armature fitted slidably in the bore for displacement therein under solenoid control, the armature comprising a generally cylindrical magnetic member that is a clearance fit in the bore, and a glide means carried by at least one of said members for guiding movement of the magnetic member relative to the tube member and preventing direct sliding contact therebetween.

BRIEF DESCRIPTION OF THE DRAWING

For a better understanding of the invention, and to show how the same may be carried into effect, reference will now be made, by way of example, to the accompanying drawing, the single figure of which is a sectional view of a solenoid actuated valve embodying the present invention.

DETAILED DESCRIPTION

The valve illustrated in the drawing is connected to the potable water system of a passenger aircraft. Reference may be made to U.S. Pat. No. 4,811,754 for information regarding the potable water system and the location of the valve.

The illustrated valve comprises a valve housing 2 in which is formed a control chamber 4. Water under pressure is delivered to the valve from the potable water system by way of a branch pipe that is connected to an inlet fitting 8. Water is introduced into the chamber 4 by way of an inlet port 6 defined by the inlet fitting 8 and leaves the chamber by way of a control port 10 formed in a housing wall 44. Located inside the chamber 4 is a float assembly 12. The float assembly comprises a cylindrical body 14 of buoyant material and a metal guide rod 16 which has a lower portion received in an axial bore 18 in the cylindrical body and has an upper portion which extends axially upwards from the body 14. Intermediate its ends, the rod 16 is formed with an annular flange 26 which extends over the upper surface of the body 14. A substantially annular sealing member 28 of synthetic rubber is attached to the upper surface of the flange 26. A spider plate 20 is positioned above the inlet fitting 8 and is retained in the control chamber 4 on removal of the inlet fitting 8 by threaded engagement with the peripheral wall of the chamber. The inlet fitting 8 supports a pleated disk filter 22 which is positioned below the spider plate 20. A rod section 21 extends upwardly from the spider plate 20 and is received slidably in the bore 18 in the body 14.

The upper end of the guide rod 16 extends upwards through the control port 10 into a discharge chamber 32 formed at the lower end of a generally cylindrical pressure tube 68 made of corrosion-resistant metal, and is received with a sliding fit in a sleeve 24 at the lower end of an actuator tube 34. The actuator tube 34 defines an interior passage 36. The passage 36 is in open communication with the chamber 32 by way of bores 38 in the transition between the sleeve 24 and the tube 34. The actuator tube 34 has a peripheral flange 40, and a helical compression spring 42 is effective between the flange 40 and the housing wall 44 to urge the actuator tube 34 and the sleeve 24 upwards.

A solenoid 64 is wound on the pressure tube 68 and has terminals (not shown) which can be connected to a source of DC voltage by way of a control switch (not shown). A tubular armature 72 of soft magnetic material is fitted slidingly in the pressure tube 68. A tubular armature stop 76, which is of low magnetic reluctance, is formed with an axial passage within which the actuator tube 34 extends. At its lower end, the armature stop 76 has an external flange that is clamped between the housing wall 44 and the lower end of the pressure tube 68. The armature stop has a shoulder that engages the flange 40 of the actuator tube and limits upward movement of the actuator tube under the force of the spring 42. The armature 72 is formed with an axial passage 82, which is about the same diameter as the passage 36 in the actuator tube 34, and therefore the lower end of the armature provides a shoulder 84 against which the actuator tube 34 bears. The upper end of the armature 72 engages a shoulder 77, which establishes an upper limit for the range of movement of the armature within the bore defined by the pressure tube.

A compression spring 78 is located between the armature stop 76 and the armature 72. The spring 78 is quite stiff and is spaced slightly from the armature when the armature is in its upper limit position.

When the armature 72 is in its upper limit position, it is spaced from the armature stop by an air gap 80. Therefore, when the solenoid is energized, the magnetic flux generated by the solenoid is concentrated within the air gap 80 and the armature 72 is pulled towards the armature stop 76. Owing to the space between the armature and the spring 78, the spring 78 does not resist downward movement of the armature over the first part of the armature's travel. Over the armature's path of movement, the magnetic force attracting the armature to the armature stop increases as the air gap 80 becomes smaller. When the armature has travelled sufficiently to contact the spring 78, the force of attraction between the armature and the armature stop is sufficient to overcome the resistance of the spring 78. During downward movement of the armature 72, the armature pushes against the tube 34, which pushes the rod 16 downwards so that the control port 10 is opened. When the armature 72 engages the armature stop 76, which establishes a lower limit for the range of movement of the armature, a narrow annular land 86 on the upper end of the armature stop 76 prevents direct contact between the armature and the armature stop except at the location of the land and thereby provides a gap of high reluctance in the magnetic circuit containing the armature. This ensures that when the solenoid 64 is de-energized and the magnetic field created by the solenoid collapses, the residual magnetism in the materials does not hold the armature in contact with the armature stop against the force of the springs 42 and 78.

When the armature is in its lower limit position and the solenoid is de-energized, the actuator tube 34 is able to move upwards under the force of the spring 42 and the control port 10 closes. Upward movement of the actuator tube 34 forces the armature away from the armature stop toward its upper limit position.

At its upper end, the pressure tube 68 is provided with a vacuum breaker (not shown). Reference may be made to U.S. Pat. No. 4,811,754 for description regarding the structure and manner of operation of the vacuum breaker and the operation of the solenoid actuated valve in conjunction with the aircraft's potable water system and vacuum toilet system.

The armature 72 is preferably made of 430F stainless steel. The stainless steel is passivated and therefore has a very thin oxide coating that resists further oxidation. The armature 72 is formed with two peripheral grooves 112, 114, and glide rings 120, 122 are fitted in the grooves respectively. It is desirable that the glide rings be far apart in order to prevent tilting movement of the armature in the pressure tube. Nevertheless, the upper glide ring 120 should be located sufficiently far from the upper end of the armature that it does not interfere with the linking of flux through the armature. The lower ring 122 is placed symmetrically with respect to the upper ring in order to avoid the possibility of error in installing the armature in the solenoid bore.

It is desirable that the external diameter of the armature be large in order to minimize flux leakage, but that there should be no physical contact between the armature and the pressure tube in order to avoid friction and associated galling. Further, it is desirable that the grooves 112 and 114 be shallow, in order to minimize disruption to the magnetic circuit containing the armature. The glide rings should bottom in their respective grooves, to avoid play between the glide rings and the armature. Consequently, the wall thickness of the glide rings should be small enough that the glide rings will fit in grooves of minimum depth, yet large enough to provide good durability, consistent geometry, and remain captive within the grooves under lateral movement of the armature.

The material from which the glide rings are made is selected so that the glide rings are dimensionally stable in the rinse liquid, i.e. they do not shrink or swell, they provide a low friction bearing surface against the interior surface of the solenoid bore, they are wear resistant, and they do not support fungus growth or bacteria. Preferably, the glide rings are made of a PTFE material, such as the processed PTFE sold by Tetrafluor Inc. of El Segundo, Calif. under the designation 430 TETRALON, the glass filled PTFE material sold by W. S. Shamban & Company through its Seals Division of Fort Wayne, Ind. under the designation TURCITE 56, or a graphite filled PTFE.

The preferred materials for the glide rings are quite hard and non-yielding, and accordingly the glide rings are split, as shown at 126 for the glide ring 120, so that they can be installed in their grooves by opening up at the split and sliding over the armature. Alternatively, if the material of the glide rings is sufficiently yielding, the glide rings can be stretched slightly to fit over the peripheral surface of the armature and be installed in their grooves.

It will be appreciated that the present invention is not restricted to the particular embodiment that has been described and illustrated, and that variations may be made therein without departing from the scope of the invention as defied in the appended claims and equivalents thereof. For example, it is not necessary for the valve assembly to include a vacuum breaker valve as an integral component thereof.

I claim:

1. A solenoid actuated valve for controlling supply of water from a potable water system of a transport vehicle to a toilet bowl installed in the vehicle, said valve comprising:

a tube member that is made of corrosion-resistant metal and defines a passage, said tube member being part of a housing having an inlet opening and an outlet opening and the passage defined by the tube member extending from the inlet opening to the outlet opening, an armature fitted slidably in the passage for displacement therein under solenoid control, the armature being tubular and comprising a generally cylindrical magnetic member that is made of passivated stainless steel and is a clearance fit in the passage, and a glide means carried by at least one of said members for guiding movement of the magnetic member relative to the tube member and preventing direct metal-to-metal contact therebetween, the glide means comprising at least one solid glide member made of a material that is dimensionally stable in water, provides a low friction bearing surface, is wear resistant, and does not support growth of fungus or bacteria, an actuator tube fitted within the passage between the armature and the inlet opening and slidable in the passage between a first position, in which the valve is open and water that enters the housing by way of the inlet opening flows through the actuator tube and the tubular armature toward the outlet opening, and a second position, in which the valve is closed, and wherein when the solenoid is energized, the armature engages the actuator tube and urges the actuator tube toward its first position, a first spring urging the actuator tube toward the second position, a magnetic armature stop fitted inside the tube member between the armature and the inlet opening for limiting movement of the armature toward the inlet opening and forming part of a magnetic circuit containing the armature, a second spring urging the armature away from the armature stop, and a means forming a gad of high magnetic reluctance in the magnetic circuit when the armature engages the armature stop, whereby when the solenoid is de-energized the second spring is able to force the armature away from the armature stop.

2. A valve according to claim 1, wherein the magnetic member is formed with first and second peripheral grooves spaced apart therealong and the glide means comprises first and second glide rings fitted in the first and second grooves respectively.

3. A valve according to claim 1, wherein the glide means comprises at least one ring formed of a composite PTFE material.

4. A valve according to claim 3, wherein the glide ring is formed of a glass filled PTFE material.

5. A valve according to claim 3, wherein the glide ring is formed of a graphite filled PTFE material.

6. A solenoid actuated valve for controlling flow of fluid through a passage defined by a tube member that is part of a housing having an inlet opening and an outlet opening, and wherein the passage defined by the tube member extends from the inlet opening to the outlet opening, said valve comprising:

a tubular armature fitted slidably in the passage for displacement therein under solenoid control, the armature comprising a generally cylindrical magnetic member that is made of passivated stainless steel and is a clearance fit in the passage, and a glide means carried by at least one of said members for guiding movement of the magnetic member relative to the tube member and preventing direct sliding contact therebetween, an actuator tube fitted within the passage between the armature and the inlet opening and slidable in the passage between a first position, in which the valve is open and fluid that enters the housing by way of the inlet opening flows through the actuator tube and the tubular armature toward the outlet opening, and a second position, in which the valve is closed, and wherein when the solenoid is energized, the armature engages the actuator tube and urges the actuator tube toward its first position, a first spring urging the actuator tube toward the second position, a magnetic armature stop fitted inside the tube member between the armature and the inlet opening for limiting movement of the armature toward the inlet opening and forming part of a magnetic circuit containing the armature, a second spring urging the armature away from the armature stop, and a means forming a gap of high magnetic reluctance in the magnetic circuit when the armature engages the armature stop, whereby when the solenoid is de-energized the second spring is able to force the armature away from the armature stop.

* * * * *